United States Patent
Lee et al.

(10) Patent No.: US 7,132,126 B2
(45) Date of Patent: Nov. 7, 2006

(54) ROOM TEMPERATURE SYNTHESIS OF MULTIWALLED CARBON NANOSTRUCTURES

(75) Inventors: Shuit-Tong Lee, Yuen Long (HK); Chi-Pui Li, Taiwai (HK); Xu-Hui Sun, Ma An Shan (CN); Ning-Bew Wong, Quarry Bay (HK); Chun-Sing Lee, Kowloon (HK); Boon-Keng Teo, Chicago, IL (US)

(73) Assignee: City University of Hong Kong, Kowloon (HK)

( * ) Notice: Subject to any disclaimer, the term of this patent is extended or adjusted under 35 U.S.C. 154(b) by 515 days.

(21) Appl. No.: 10/273,242

(22) Filed: Oct. 17, 2002

(65) Prior Publication Data
US 2004/0076576 A1    Apr. 22, 2004

(51) Int. Cl.
*B05D 7/00*    (2006.01)
(52) U.S. Cl. .................. 427/220; 428/28; 428/901; 428/903; 423/447.1; 977/DIG. 1
(58) Field of Classification Search ............... 427/220, 427/228, 901, 903, 290.1; 423/447.1; 977/DIG. 1
See application file for complete search history.

(56) References Cited

OTHER PUBLICATIONS

J.Y. Dai et al. "Synthesis of carbon-encapsulated nanow. res using polycyclic aromatic hydrocarbon precursors" chemical physics letters 62587 pp. 547-553, Aug. 23, 1996.*
Ph. Gerhardt, et al. "Polyhedral Carbon ions in hydrocarbon flames" Chemical physics letters vol. 137, No. 4—pp. 306-310, Jun. 19, 1987.*
No author "Extraction of Fullerene Molecules in ultratonic agitation" IBM Technical Disclosure Bulletin vol. 35 No. 18 p. 165, Jun. 1, 1992.*
P.L. Walker Jr. (editor) "The thermal conductivity of graphite" Chemistry and Physics of carbon vol. 5 p. 155, 1969.*
"The Temperature of Cavitation" by Flint, E. et al. (Sep. 1991) *Science*, vol. 253, pp. 1397-1399.

* cited by examiner

*Primary Examiner*—Colleen P. Cooke
*Assistant Examiner*—Rebecca M. Stadler

(57) ABSTRACT

A simple chemical technique has been developed to grow large quantity of carbon nanostructures, including carbon nanotubes, hydrocarbon nanotubes and carbon nanoonions, in the organic solution at ambient (room) temperature and atmospheric pressure using silicon nanostructures (nanowires, nanodots, ribbons, and porous silicon) as starting materials. These CNT and CNO have the lattice d-spacing from 3.4 Å to 5 Å.

8 Claims, 11 Drawing Sheets

ROOM TEMPERATURE SYNTHESIS OF MULTIWALLED CARBON NANOSTRUCTURES

FIELD OF THE INVENTION

The present invention relates to a method of using carbon-containing organic solvents and non-carbon nanostructures (for example silicon nanowires, nanodots and porous silicon) as starting materials for the growth of carbon nanostructures such as multi-walled carbon nanotubes (MWCNT), multi-walled carbon nanoonions (MWCNO) and hydrocarbonate nanotubes (HCNT) in solutions at ambient temperature and pressure.

BACKGROUND OF THE INVENTION

Materials engineering at the nanometer scale can provide smaller devices than those currently available. In particular, research on semiconductor nanostructures with size-dependent optical and electronic properties, such as quantum-dots, one-dimensional quantum wire transistors and light emitting devices with extremely low power consumption is motivated by potential applications. Carbon is a material of great interest for nanostructures because of its important role in the field of microelectronics.

Carbon nanotubes (CNT) have attracted much attention since their discovery a decade ago (Iijima, Nature. 354, 56, 1991). Due to its high aspect ratio, a CNT can enhance a large electric field. This greatly increases the electron emission in a lower strength electric field. In addition to this, CNTs have a wide range of highly interesting properties and potential applications. Most methods of CNT formation are under the conditions of high temperature (>300° C.) and high vacuum. This type of process substantially increases the cost of industrial production. Although the formations of CNT (Hsin, et al., Adv. Mater. 13. 830, 2001) and carbon nano-onion (CNO) (Sano, et al., Nature. 414, 506, 2001) by arc discharge using graphite electrodes in water under room temperature have been reported, one of the challenging issues is to produce CNTs in high-quality (without any metal catalysts) and large quantity within a short time.

SUMMARY OF THE INVENTION

According to the present invention there is provided a method of forming carbon nanostructures comprising the steps of reacting non-carbon nanostructures in an organic solvent.

The non-carbon nanostructures may preferably be silicon nanostructures such as silicon nanowires, silicon nanodots, silicon nanoribbons. Other possible materials include porous silicon and germanium nanowires.

The solvent may be an organic solvent that includes carbon. For example the solvent may be a hydrocarbon, or another carbon-containing solvent. Preferred solvents include $CH_3I$, $CHCl_3$, $CCl_4$, $C_6H_6$, $CH_2CH_2Br_4$, $CH_2Cl_2$, $C_4H_8O_2$ (1,4 Dioxane) and $CDCl_3$. $CH_3I$ and $CHCl_3$ are particularly preferred.

Preferably the non-carbon nanostructures may be refreshed prior to reacting with the solvent to remove any oxides.

Preferably the method may be carried out at room temperature and pressure, though the reaction would be speeded up if bath sonication is used. Higher temperatures and pressures, however, would improve the quality of the carbon nanostructures.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

The present invention provides a novel technique that at least in its preferred forms, is capable of producing large quantities of carbon nanostructures, including carbon nanotubes, hydrocarbon nanotubes and carbon nanoonions, in an organic solution under ambient conditions; that is at a temperature as low as 300°K (room temperature) and atmospheric pressure. The novelty of this simple method lies in the use of silicon nanostructures (nanowires, nanodots, ribbons, and porous silicon) as a starting material. These CNT, CNO and HCNT, preferably with lattice d-spacings ranging from 3.4 Å to 5 Å, can be produced in large quantities due to the possibility of the large quantity production of SiNWs (Wang, et al., Phys. Rev. B, 58, R16024 1998). Since the simple, common, and inexpensive organic solvents are used, these environmentally and economically benign CNT, CNO and HCNT may be useful in many applications.

In the following examples CNT, CNO and HCNT were produced in solution via the reaction of precursor silicon nanostructures (nanowires, nanodots and porous silicon) with organic solvents under ambient conditions (room temperature and atmospheric pressure).

Silicon nanowires are one-dimensional wires of silicon, which can be synthesized by various chemical vapor deposition or physical vapor deposition methods, including thermal evaporation or laser ablation of SiO or Si+$SiO_2$ or laser ablation or chemical vapor depositions using metal-containing silicon targets. The thus prepared silicon nanowires were refreshed by a controlled HF treatment (e.g. in 5% HF aqueous solution for 5 minutes) to remove the oxide layer. The surfaces of the HF-etched samples were coated by hydrogen (i.e. $SiH_x$ terminated, where x=1-3), which made the wires very reactive. For example, the HF-treated samples can reduce various metal ions such as silver, copper, gold, etc. to metal nanostructures at room temperature (Sun, et al., J. Appl. Phys., 89, P6393, 2001). When HF-etched silicon nanowires were dispersed in any of the common carbon-containing organic solvents; such as $CHCl_3$, $CH_2Cl_2$, $CH_3I$, $C_6H_6$, etc (and the present invention extends to the use of any feasible carbon containing solution) by bath sonication at room temperature and atmospheric pressure, the solution changed to a colloidal appearance in minutes.

The carbon nanostructure products were collected in the solution. The controlled HF treatment experiments were carried out in plastic vessels and the reaction experiments were carried out in common glass vessels. The nanostructure of the samples were prepared by putting a few drops of the resulting solution onto the "holey" carbon grids and dried in air, and characterized by transmission electron microscope (TEM), high-resolution transmission electron microscope (HREM) (Philips CM200 at 200 kV), elemental mapping and electron energy loss spectrum (EELS) (Gatan GIF 200).

EXAMPLE 1

Figure 1:
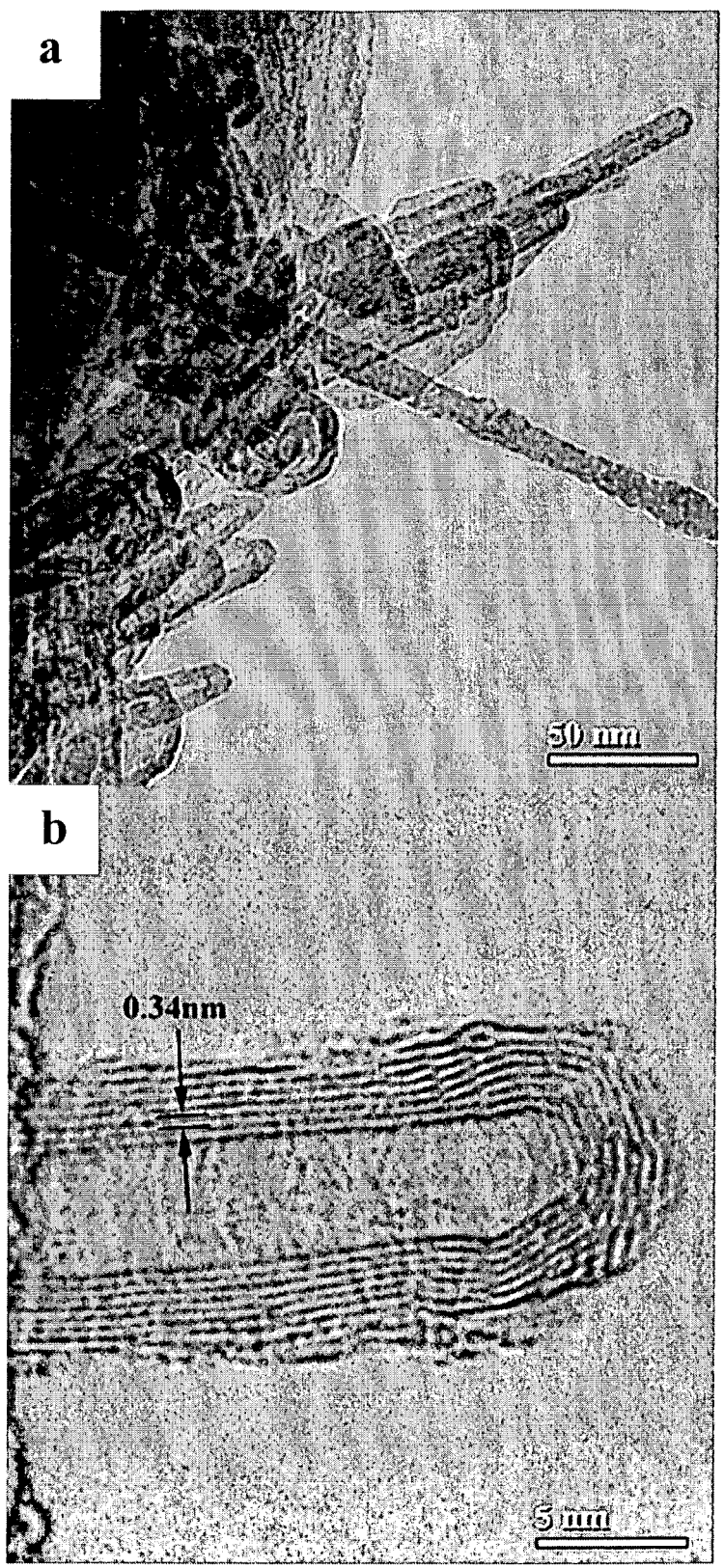
FIG. 1 shows (a) a transmission electron microscopy (TEM) micrograph showing a branch of CNT, (b) a high resolution transmission electron microscopy (HRTEM) micrograph showing a close-end CNT with 8 walls.
Figure 2:
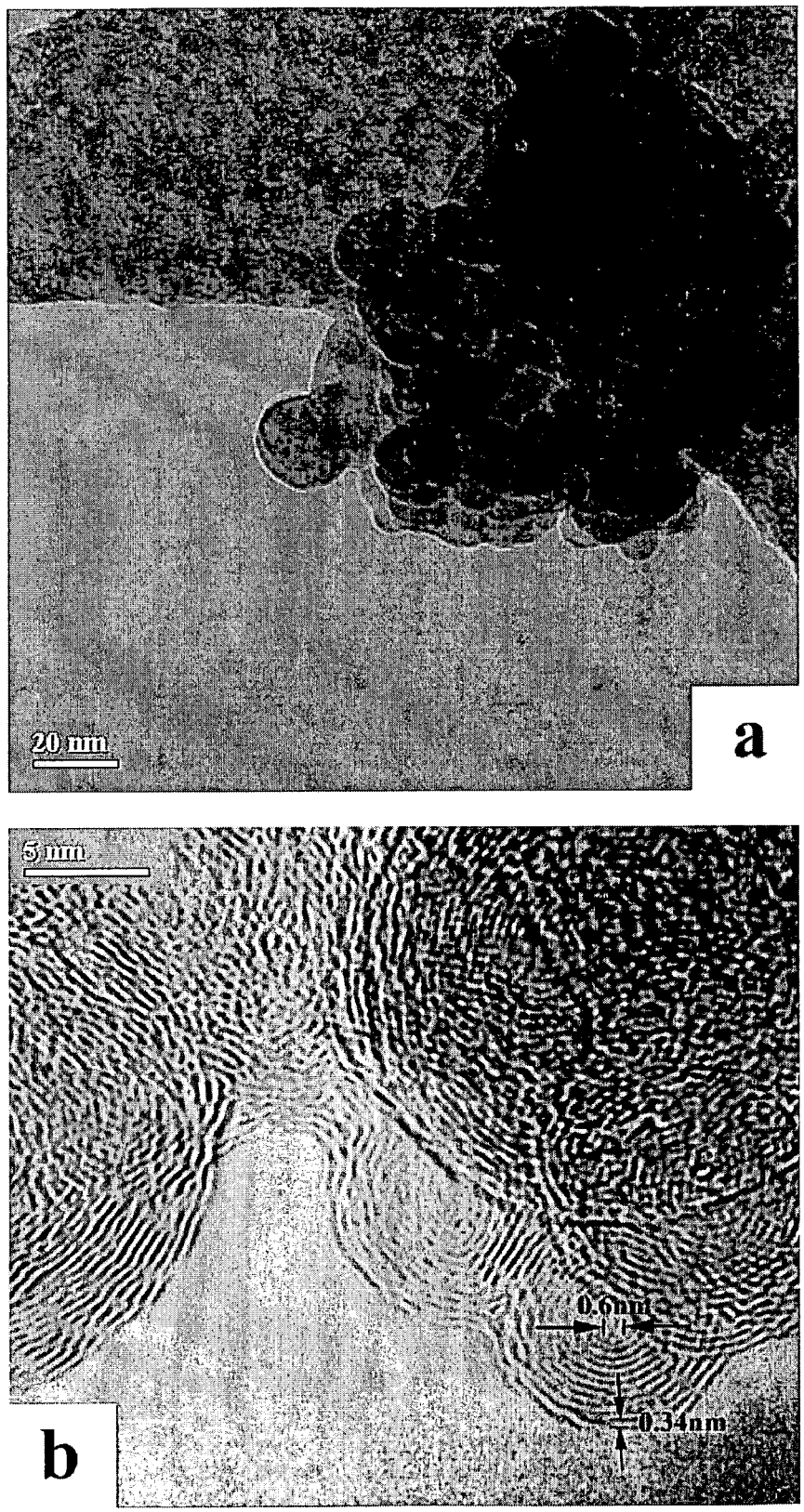
FIG. 2 shows (a) a TEM micrograph showing a large quantity of CNO, and (b) an HRTEM micrograph showing a CNO, with a lattice d-spacing of 3.4 Å in a core diameter of about 6 Å, has 10 sheets in the average and as many as 30 sheets.
Figure 3:
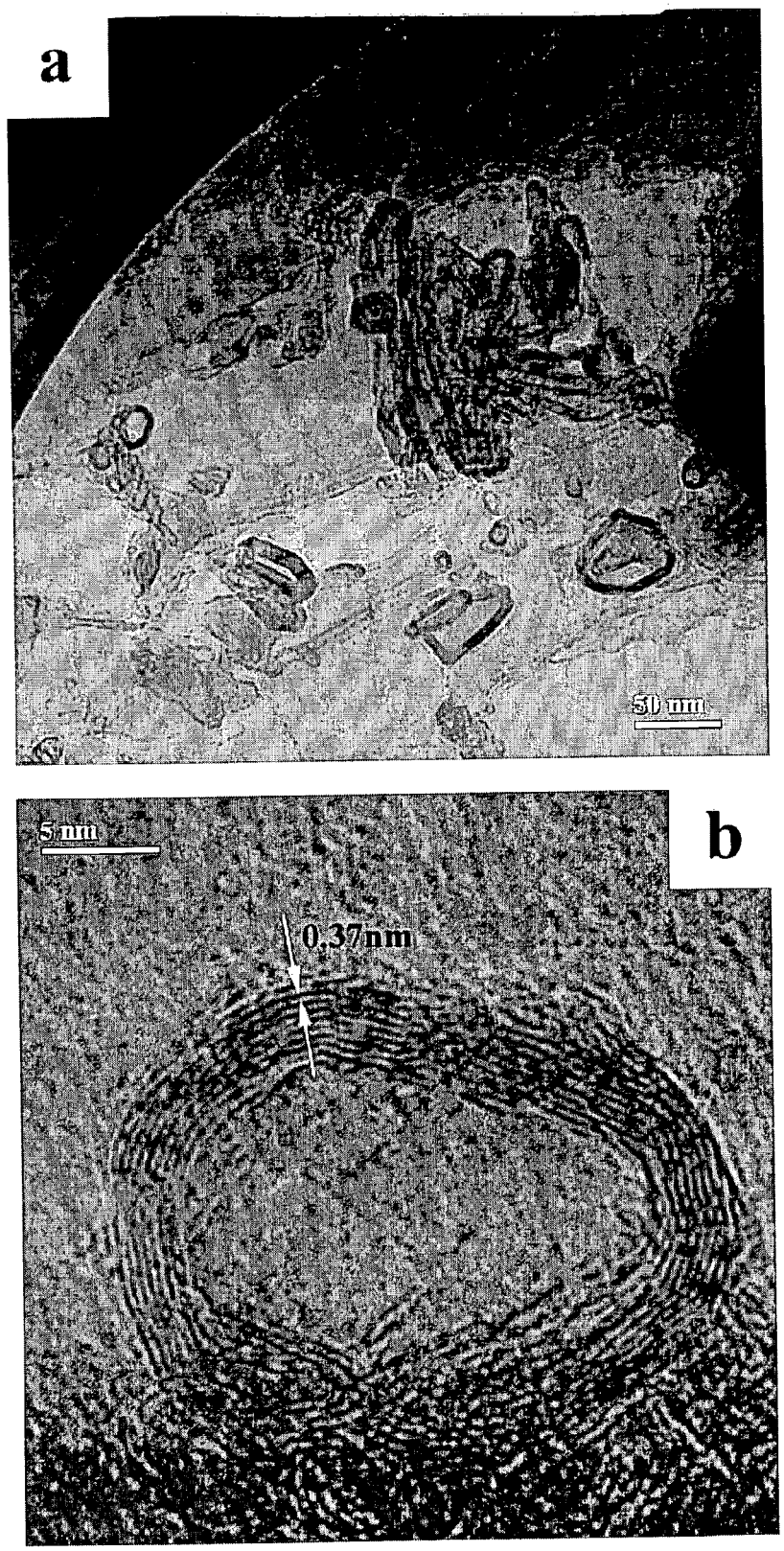
FIG. 3 shows (a) a TEM image of carbon nanoloops attached on a hydrocarbon film, (b) a close-end-loop MWHCNT with 8 hydrocarbon layers in d spacing of 3.71 Å, and (c) a 12 layered MWCNT that has d spacings of 3.51 Å.
Figure 3:
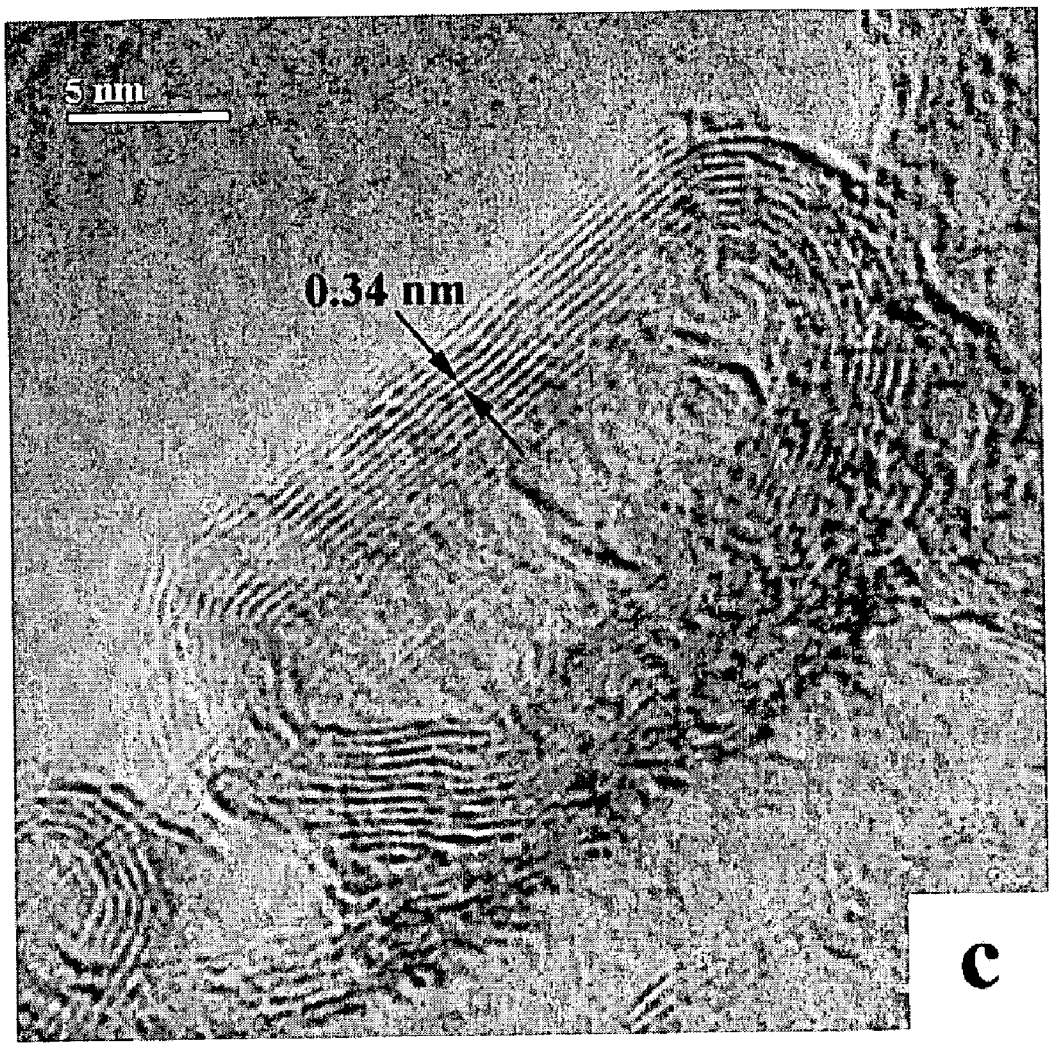
Figure 4:
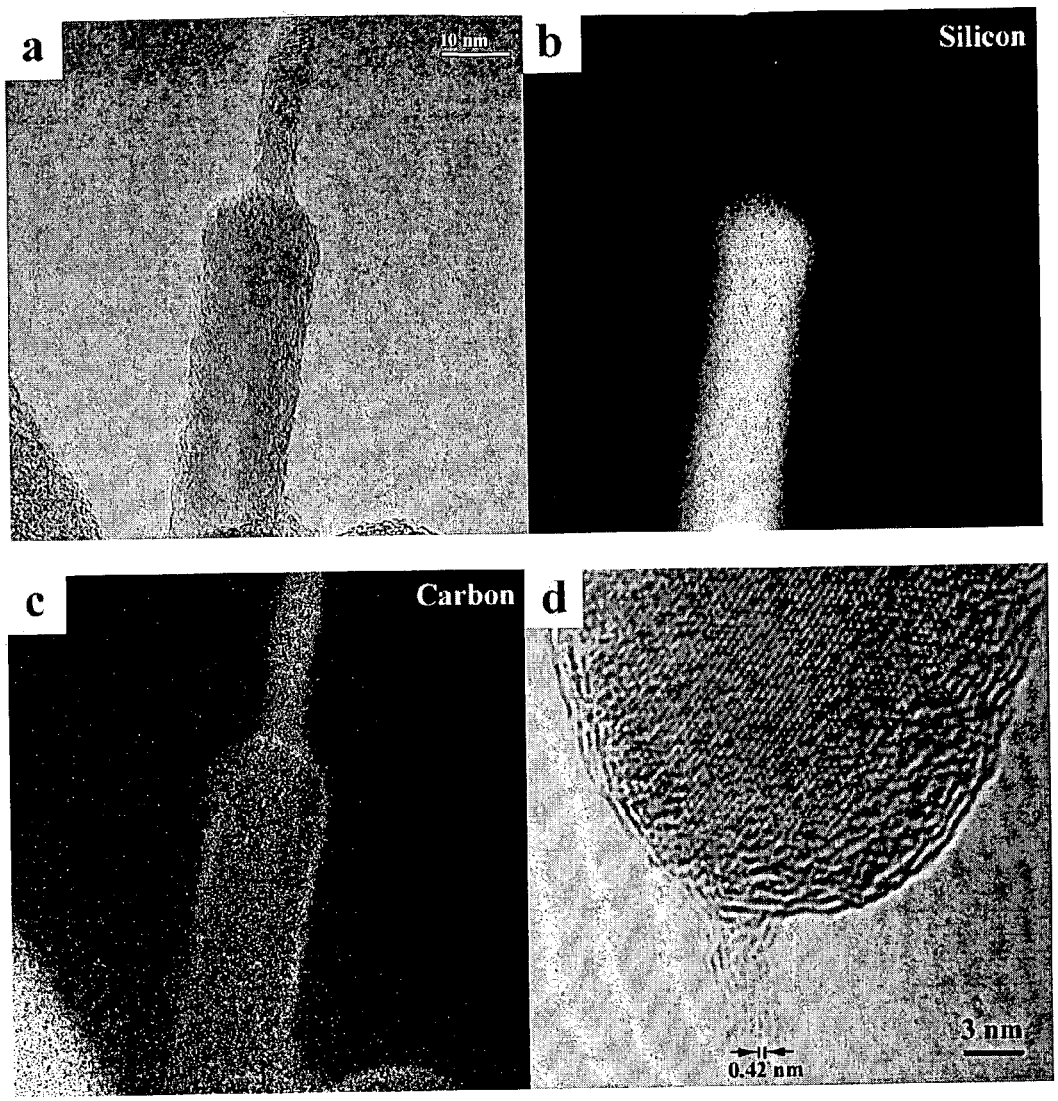
FIG. 4 shows (a) a TEM image of an oxide-removed SiNW tip connected with a nanotube, and elemental mapping images of: (b) silicon, (c) carbon, and (d) a HRTEM image of another pair of SiNW and CNT, with a lattice d-spacing is 4.2 Å.

Silicon nanowires (SiNWs) were used to produce carbon nanostructures. Silicon nanowires, which can be synthesized by thermal evaporation of SiO, are long and freestanding wires with a diameter of several nm to tens of nm, depending upon the preparation conditions and are usually sheathed by a silicon oxide layer. SiNWs were immersed in 5% HF aqueous solution for 5 minutes to remove their oxide outer layer. The HF-etched SiNWs were transferred to a solution of $CHCl_3$ (Lab-Scan 99.5%) immediately and dispersed by bath sonication for 15 minutes at room temperature and atmospheric pressure. The solution changed to colloidal in appearance. High-resolution transmission electron microscopy (HRTEM, Philips CM200 FEG, operated at 200 KeV) samples were prepared by putting a few drops of the resulting solution onto the "holey" carbon grids and dried in air. The morphology and microstructure of products of carbon nanostructures synthesized by this method are shown in FIGS. 1–4 and 6 to 9 FIG. 1(a) is a TEM image of a branch of CNT with a typical length of a few hundred nanometers. The CNT has a close cap at one end without any metal caps. The CNT has at least 8 walls, as shown in FIG. 1(b), and as many as 30 walls with an average inner diameter of 3 nm in a range of 2–5 nm. The lattice d-spacing is 3.4 Å, which matches exactly the {200} lattice spacing of graphite and provides the distinctive signature of CNT. Each darkened line corresponds to the projection of a sidewall of a cylindrical graphite sheet in the CNT.

In addition to CNTs, CNOs were also made in a large quantity as shown in FIG. 2(a). With a core diameter of about 6 Å, the CNOs have 10 sheets in the average and as many as 30 sheets, as shown in FIG. 2(b). The CNO having smaller number of sheets tend to have a more regular rounder shape. As with the CNTs, the CNOs also have a lattice d-spacing of 3.4 Å.

Under the same conditions, carbon nanoloops can also be produced. As the TEM image shows in FIG. 3(a), these carbon nanoloops are attached on the hydrocarbon film. The HREM image shows a kind of close-end-loop multi walled carbon nanoloop (MWCNL) with 8 hydrocarbon layers in a d-spacing of 3.7 Å in FIG. 3(b), and another type of ring-loop with 12 layers in a d-spacing of 3.4 Å in FIG. 3(c).

Another type of CNT, which was found in connection with SINWs tips, has a lattice d-spacing ranging from 3.8 Å to 5 ÅÅ. FIG. 4(a) shows a nanowire tip connected with a nanotube. As the elemental mapping images shown in FIG. 4(b) and 4(c), this nanowire is an oxide-removed SiNW with a diameter of about 14 nm, while a layer of carbon, with a thickness of about 1 nm, wrapped the SiNW in connection with a CNT in an outer diameter of about 6 nm. As shown in the HREM image of another pair of SiNW and CNT in FIG. 4(d), the lattice d-spacing of this CNT is 4.2 Å. The microstructure of this type of multi-walled CNT is very rough. This phenomenon of wrapping with carbon layers could also be found in the different structures.

FIGS. 6(a) and (b) show HREM images of CNTs, with d-spacing of 3.4 Å, covered by different d-spacing of carbon sheets from 4.3 to 5.4 Å.

Figure 7:
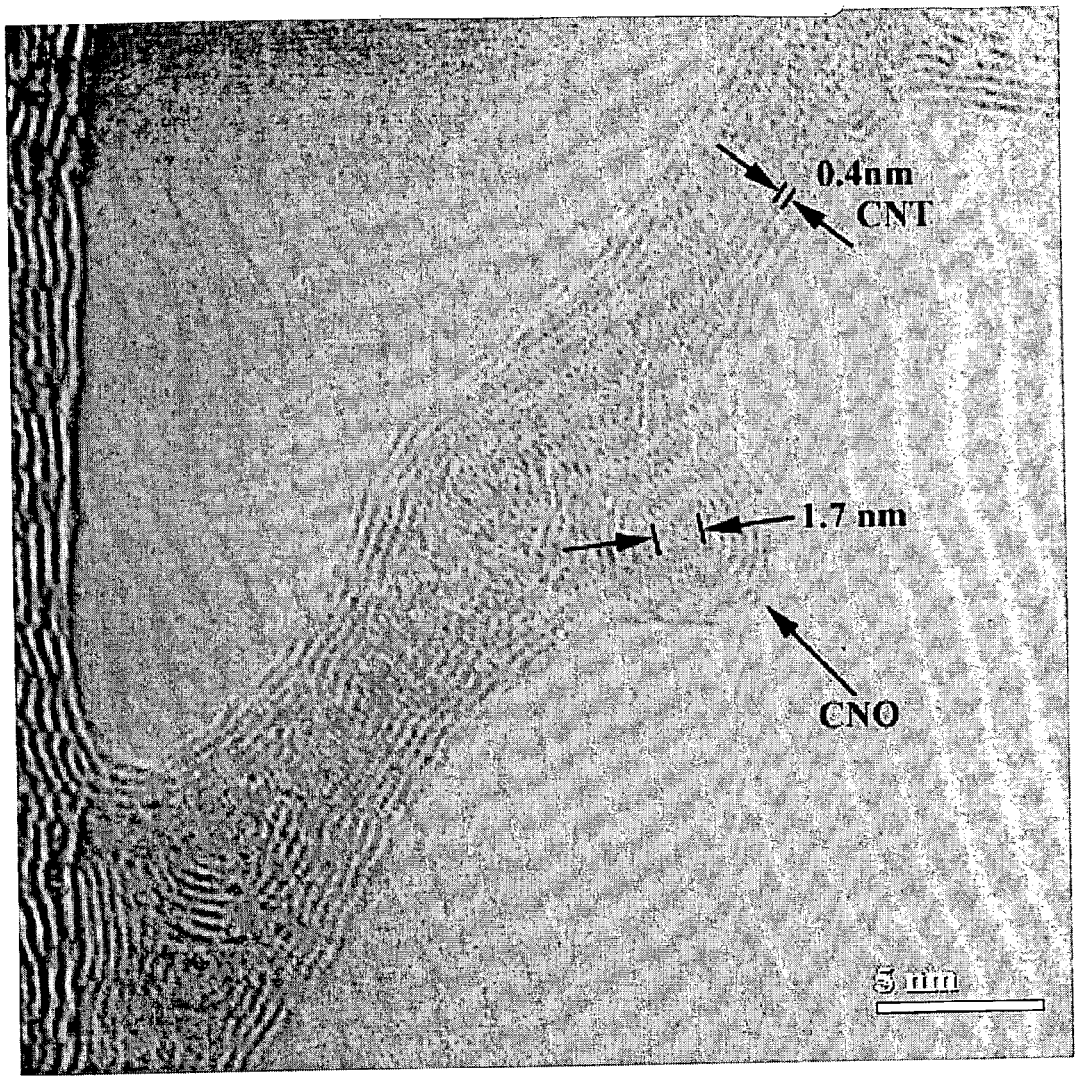
FIG. 7 shows a CNO, with a core diameter of about 1.7 nm, grown attached to the body of a CNT with a d-spacing of 4 Å.
Figure 8:
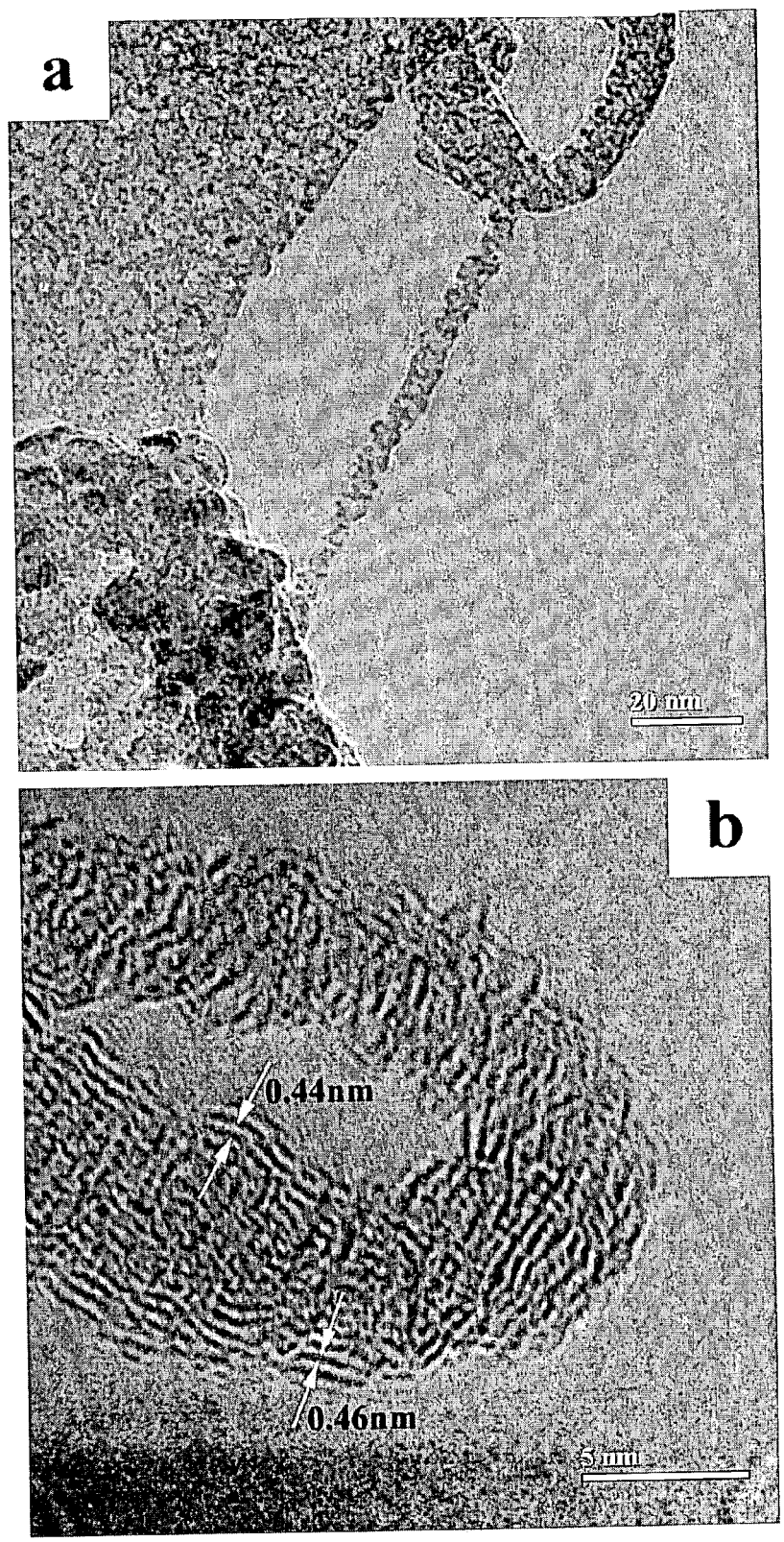
FIG. 8 shows (a) a TEM image of a MWHCNT with a very rough surface, (b) a ring shape MWHCNT wrapped with 3 layers in d-spacing of 4.4–4.6 Å., (c) a Y-shape MWHCNT with d-spacing of 5.6 Å, and (d) a tube shape of 3 nm in inner diameter and 8 inner layers in d-spacing of 4 Å wrapped by 6 layers in d-spacing of 4.7 Å.
Figure 8:
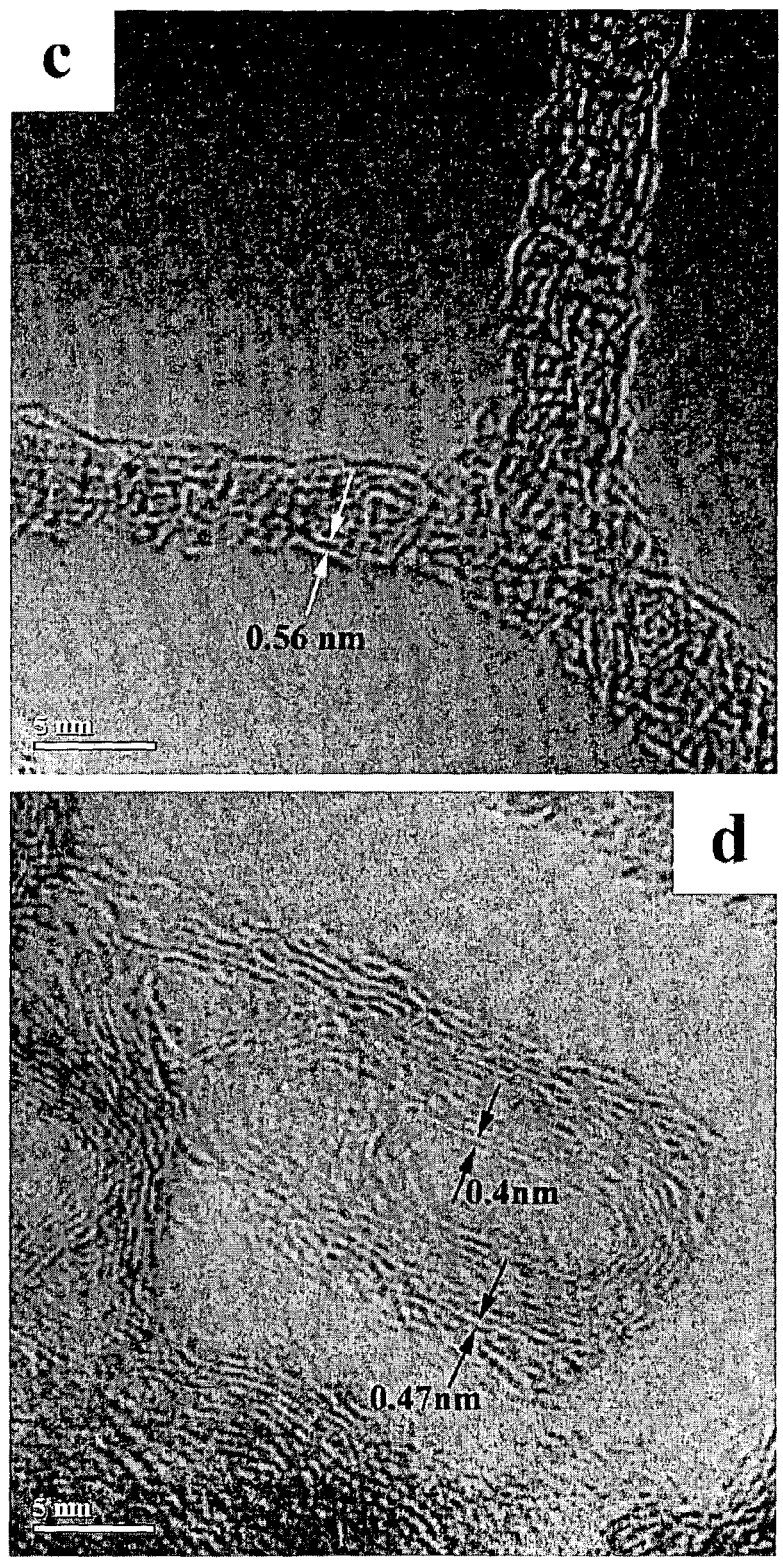

FIG. 7 shows a CNO, with a core diameter of about 1.7 nm, grown attached to the body of a CNT with a d-spacing of 4 Å.

Another type of MWHCNTs has a very rough surface as shown in FIG. 8(a). This type of MWHCNTs also exists in many different shapes, such as: ring shape wrapped with 3 layers in d-spacing of 4.4–4.6 Å (FIG. 8(b)), Y-shape MWHCNT with d-spacing of 5.6 Å (FIG. 8(c)) and tube shape of 3 nm in inner diameter and 8 inner layers in d-spacing of 4 Å wrapped by 6 layers in d-spacing of 4.7 Å (FIG. 8(d)).

Figure 9:
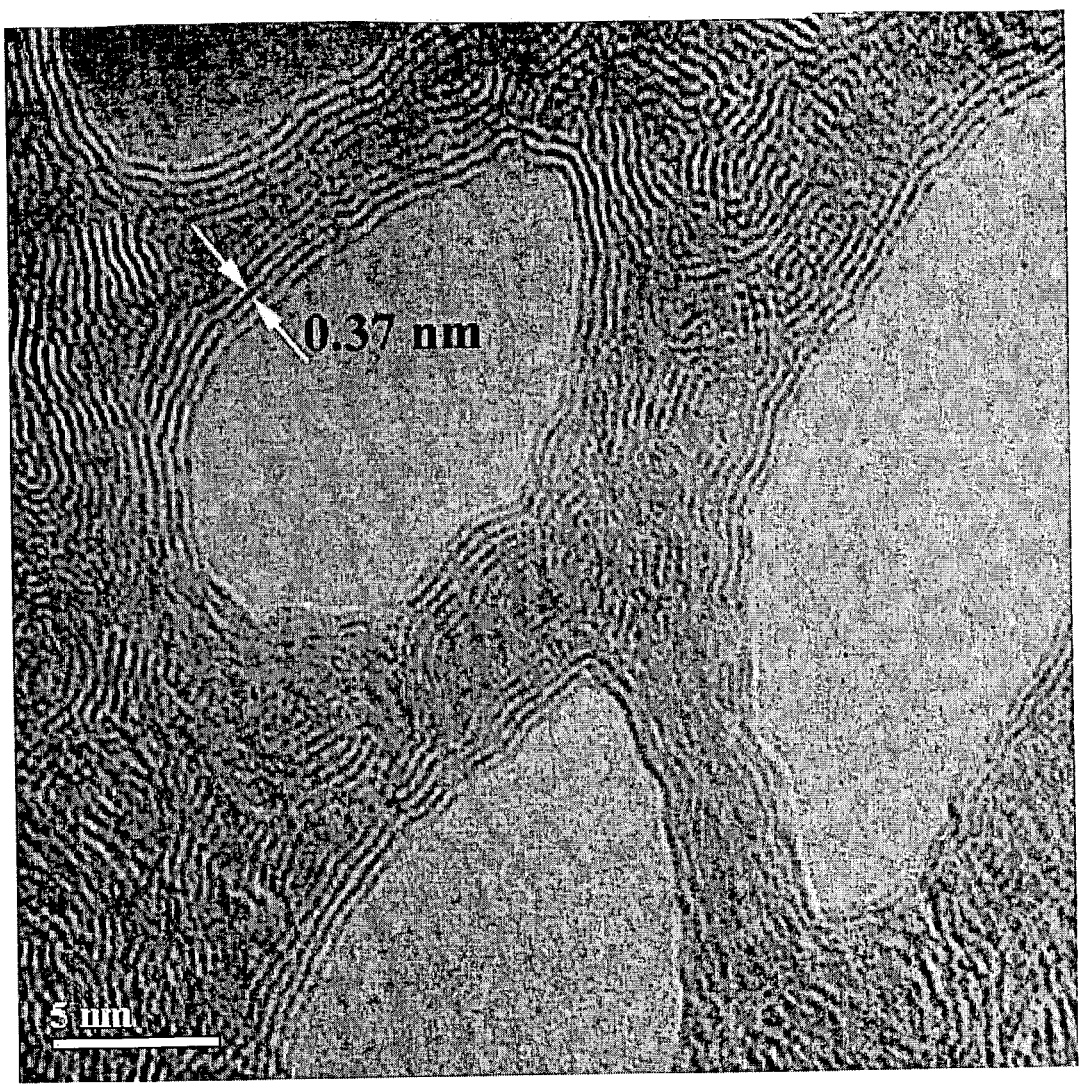
FIG. 9 shows a network film of MWHCNT with d-spacing of 3.7 Å, connected holes of the carbon holy film.

This type of MWHCNTs can also form a network film, with d-spacing of 3.7 Å, connected holes of the carbon holy film as in FIG. 9.

EXAMPLE 2

Silicon nanoparticles were used as the starting material in this example. Silicon nanoparticles were prepared by etching silicon nanoparticle chains in 5% HF aqueous solution for 5 minutes. Silicon nanoparticles were transferred to the solvent of $C_6H_6$ (Acros, 99.9%) and sonicated for 15 minutes at room temperature and atmospheric pressure. The solution changed to colloidal in appearance. High-resolution transmission electron microscopy (HRTEM, Philips CM200 FEG, operated at 200 KeV) samples were prepared by putting a few drops of the resulting solution onto the "holey" carbon grids and dried in air. The morphology and microstructure of products of carbon nanostructures synthesized by this method are shown in FIG. 5.

Figure 5:
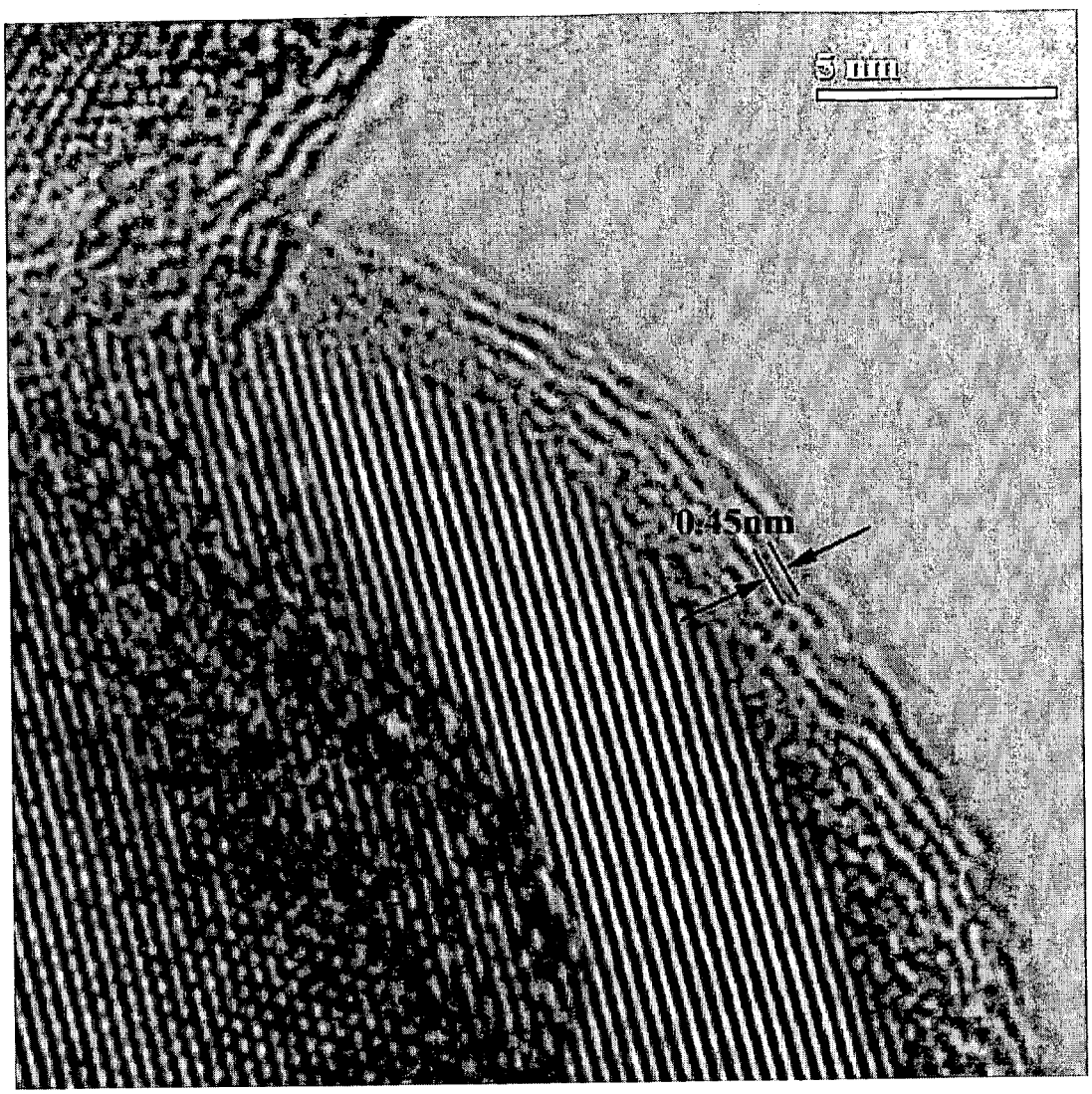
FIG. 5 shows a HRTEM image of a Si nanodots covered by 5 layers of carbon sheets with a d-spacing of 4.5 Å.
Figure 6:
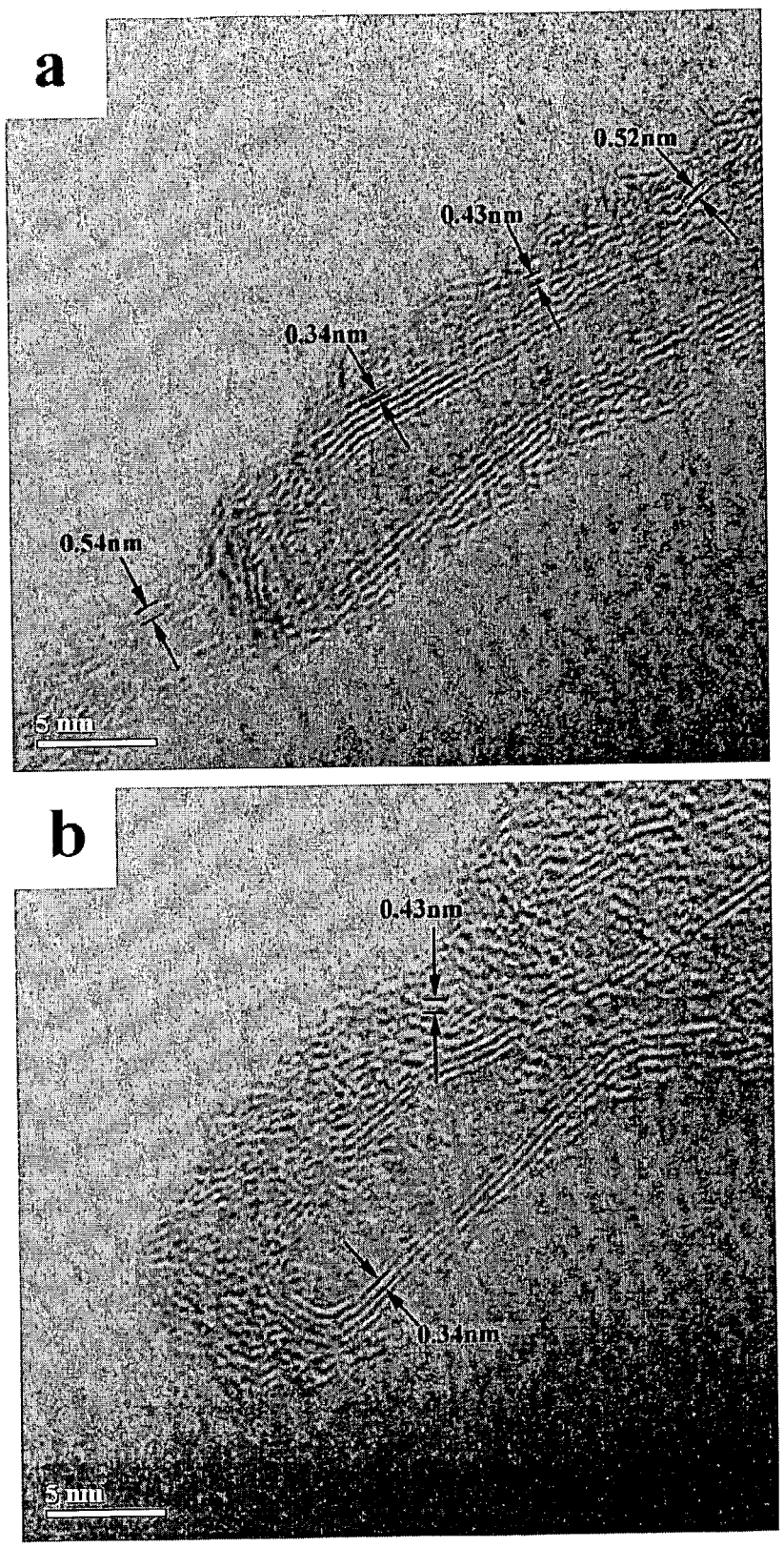
FIG. 6 shows a HRTEM image of CNTs, with d-spacing of 3.4 Å, covered by different d-spacing of carbon sheets from 4.3 to 5.4 Å.

FIG. 5 shows a HREM image of a Si nanodots covered by 5 layers of carbon sheets with a d-spacing of 4.5 Å.

It will thus be seen that the present invention, at least in its preferred forms, provides a simple method for forming carbon nanostructures based on nanostructure templates. A particular advantage of the present invention is that it is capable of being performed in ambient conditions such as room temperature and pressure, though higher temperatures and pressures may result in a higher quality end product and/or a greater yield.

The invention claimed is:

1. A method for the synthesis of carbon nanostructures comprising the step of reacting non-carbon silicon nanostructures in an organic solvent, wherein said non-carbon silicon nanostructures and said organic solvent are subjected to bath sonication.

2. A method as claimed in claim 1 wherein said non-carbon silicon nanostructures are refreshed prior to reacting with said organic solvent.

3. A method as claimed in claim 2 wherein said non-carbon silicon nanostructures are refreshed by treatment with an aqueous solution of HF.

4. A method as claimed in claim 1 wherein said non-carbon silicon nanostructures are selected from the group consisting of silicon nanowires, silicon nanodots, silicon nanoribbons, and porous silicon.

5. A method as claimed in claim 1 wherein said organic solvent comprises a hydrogen or carbon containing material.

6. A method as claimed in claim 1 wherein said organic solvent is selected from the group consisting of $CH_3I$, $CHCl_3$, $CCl_4$, $C_6H_6$, $CH_2CH_2Br_4$, $CH_2Cl_2$, $C_4H_8O_2$ (1,4 Dioxane) and $CDCl_3$.

7. A method as claimed in claim 1 wherein the reaction between said non-carbon silicon nanostructure and said organic solvent is carried out at room temperature (between 0 and 40° C.) and pressure.

8. A method for the synthesis of carbon nano-structures comprising:
   using a carbon-containing organic solvent as the starting material and the source of the carbon for the carbon nano-structures;
   reacting the organic solvent with a non-carbon nanostructure selected from the group consisting of silicon nanowires, silicon nanodots, silicon nanoribbons, porous silicon and germanium nanowires; and
   subjecting the non-carbon nanostructure and carbon-containing organic solvent to bath sonication.

* * * * *